US008852532B2

(12) United States Patent
Furrer et al.

(10) Patent No.: US 8,852,532 B2
(45) Date of Patent: Oct. 7, 2014

(54) G-FORCE SENSITIVE LABEL AND CORRESPONDING SAMPLE TUBE, METHOD AND ANALYTICAL SYSTEM

(75) Inventors: Frederic Furrer, Horw (CH); Mark James Simmons, Carmel, IN (US)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1104 days.

(21) Appl. No.: 12/818,404

(22) Filed: Jun. 18, 2010

(65) Prior Publication Data

US 2011/0313684 A1  Dec. 22, 2011

(51) Int. Cl.
*B04B 1/00* (2006.01)
*B01L 3/00* (2006.01)

(52) U.S. Cl.
CPC ........ *B01L 3/5021* (2013.01); *B01L 2300/021* (2013.01); *B01L 2300/0663* (2013.01); *B01L 2200/146* (2013.01); *B01L 2300/025* (2013.01)
USPC ........... 422/548; 422/547; 422/549; 116/203; 116/212; 116/215

(58) Field of Classification Search
CPC . B01L 3/5021; B01L 3/5082; B01L 2300/02; B01L 2300/021; B01L 2300/024; B01L 2300/025; B04B 5/0414
USPC .......... 116/201, 203, 212, 215; 422/547, 548, 422/549, 568
See application file for complete search history.

(56) References Cited

U.S. PATENT DOCUMENTS

| 6,848,389 | B1 | 2/2005 | Elsasser et al. |
| 7,231,804 | B1 | 6/2007 | Smith et al. |
| 7,449,212 | B2 | 11/2008 | Schneider |
| 2005/0181160 | A1 | 8/2005 | Schneider |
| 2005/0217558 | A1 | 10/2005 | Fitzer et al. |
| 2009/0066076 | A1 | 3/2009 | Schneider |

FOREIGN PATENT DOCUMENTS

| WO | 03/089250 | 10/2003 |
| WO | 2006066787 A1 | 6/2006 |

*Primary Examiner* — Jill Warden
*Assistant Examiner* — Dwayne K Handy
(74) *Attorney, Agent, or Firm* — Barnes & Thornburg LLP

(57) ABSTRACT

A g-force-sensitive label for detecting and indicating the application of a g-force is provided, the g-force sensitive label comprising an area for detecting and indicating an application of a g-force above a threshold value on the g-force sensitive label and an attachment area for attaching the g-force sensitive label on an object. At least one physical property of the area measurably changes its state upon applying a g-force above the threshold value, thereby altering a displayed pattern such that a machine-readable 1D or 2D or alphanumeric code is displayed.

13 Claims, 9 Drawing Sheets

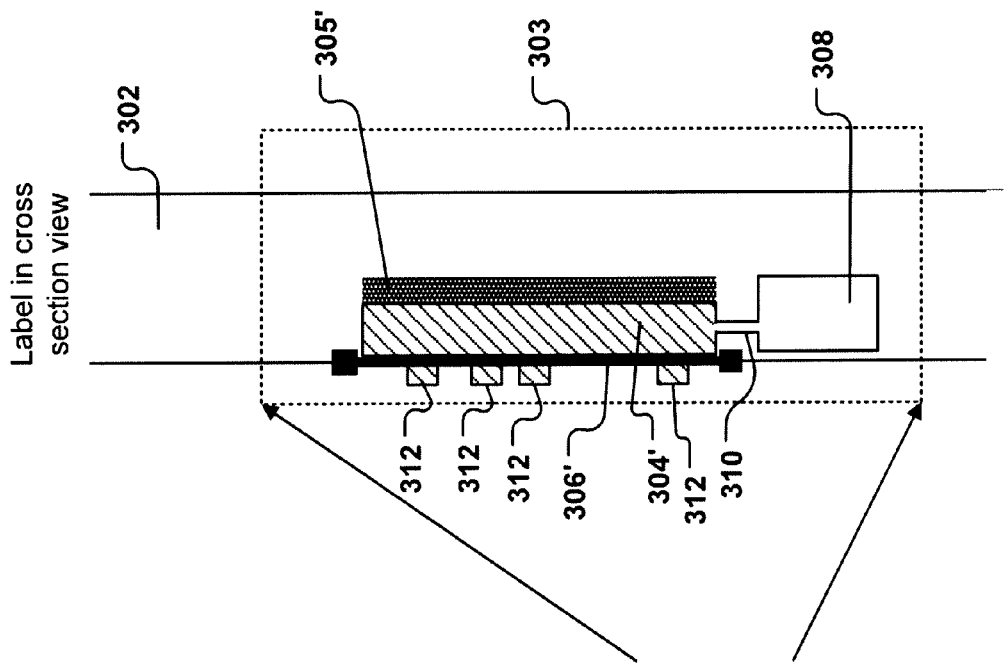
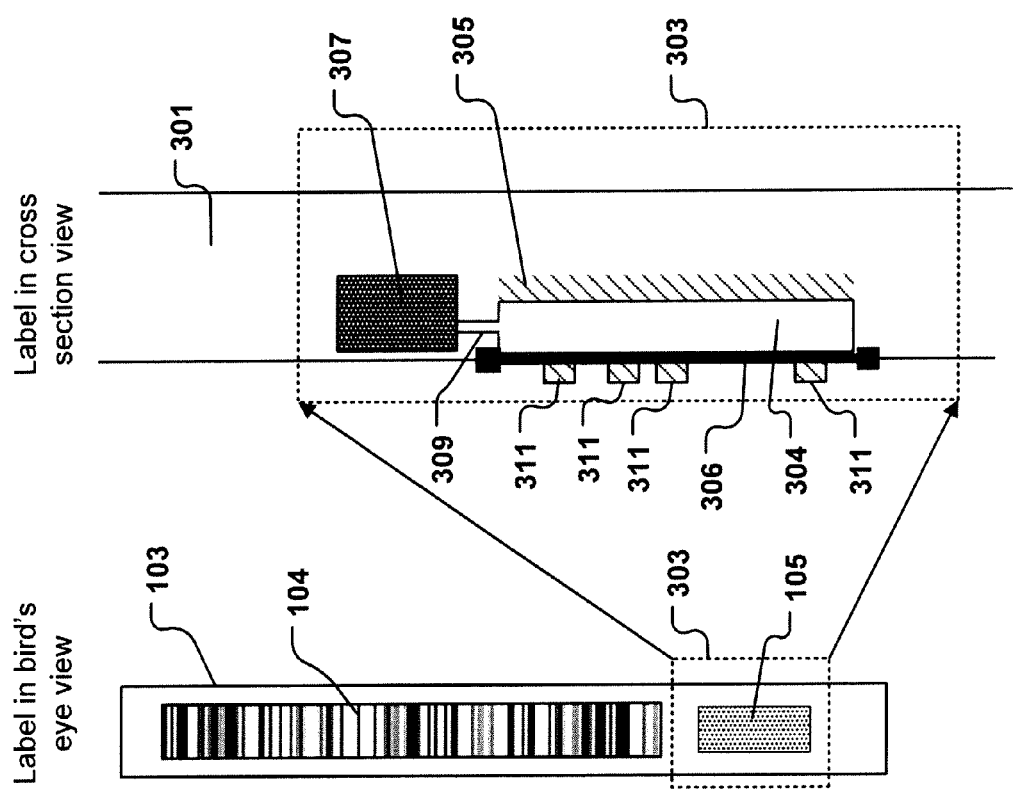

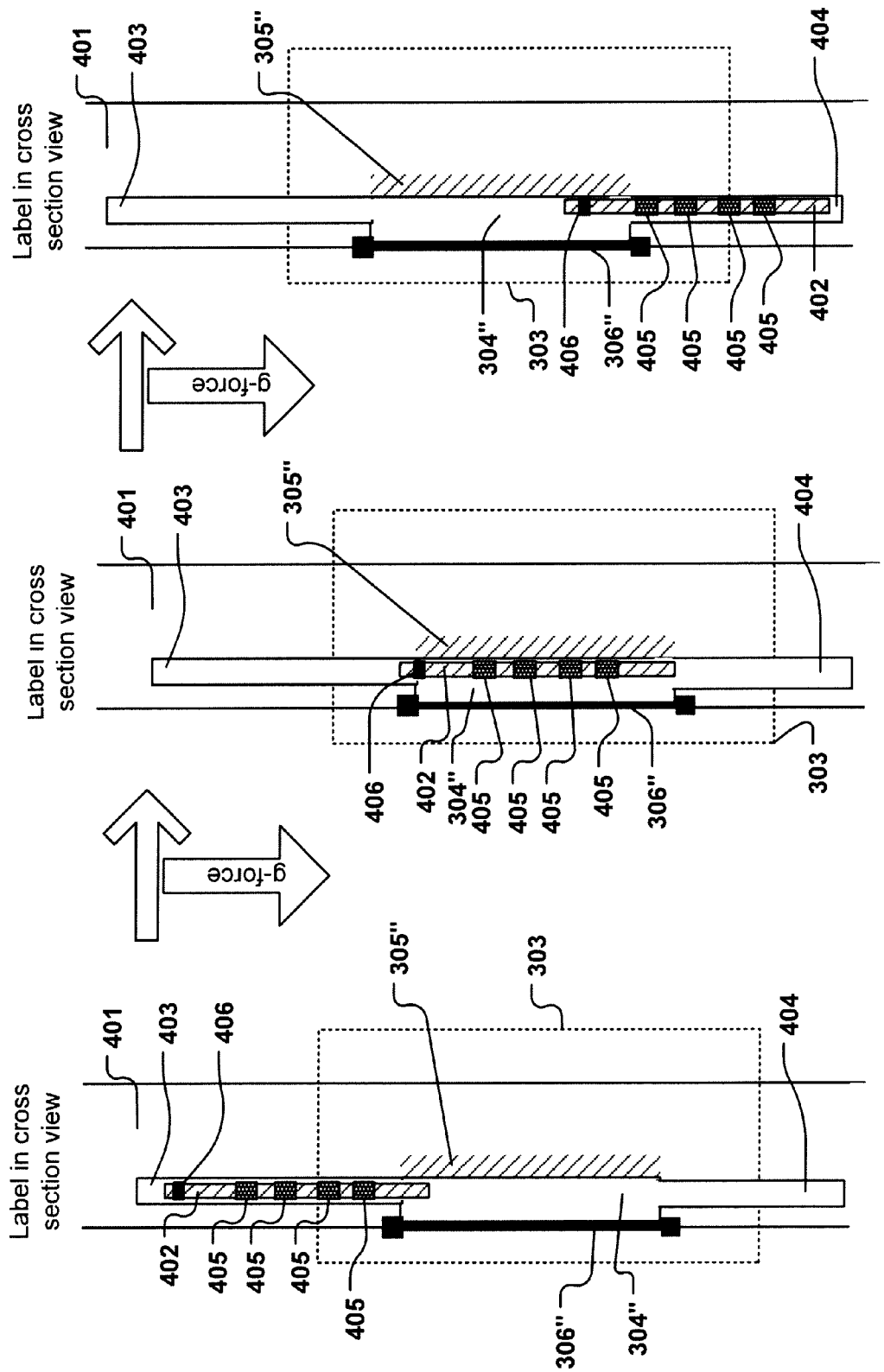

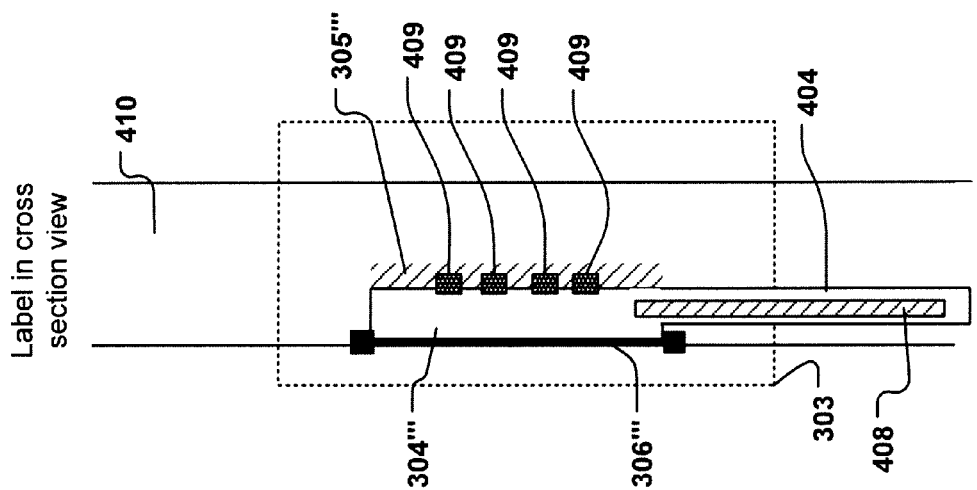
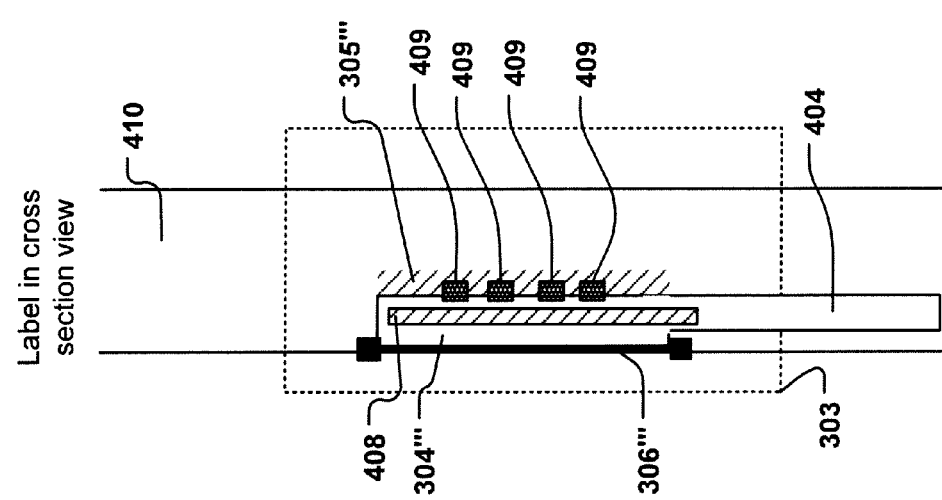

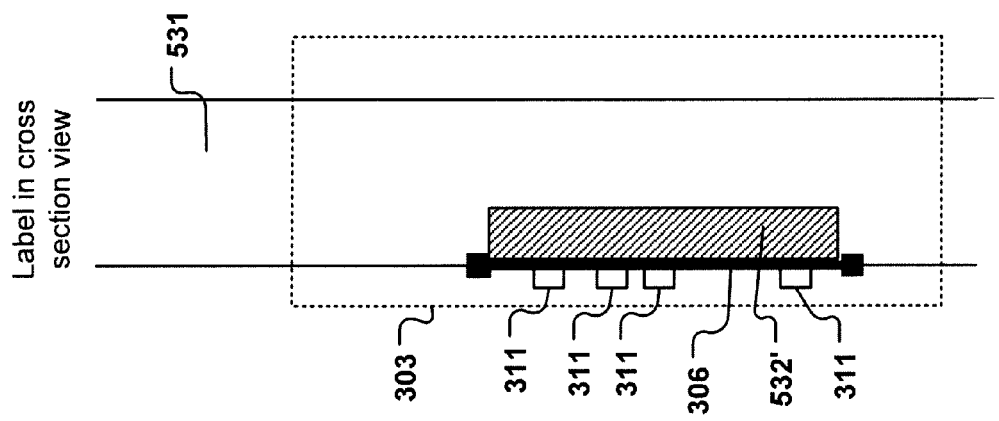
Figure 5e
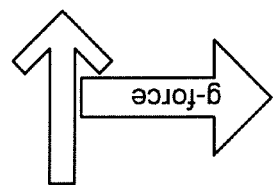
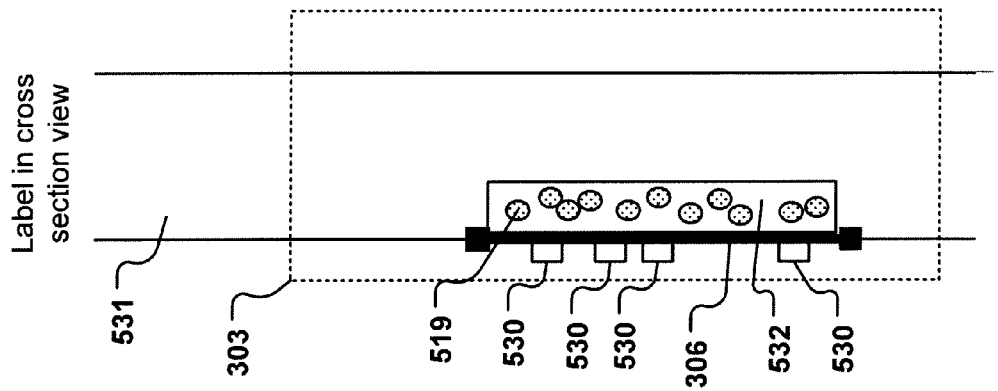
Figure 5d

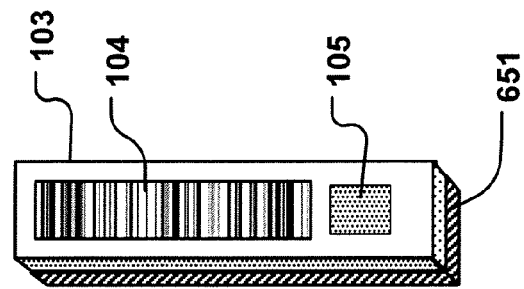
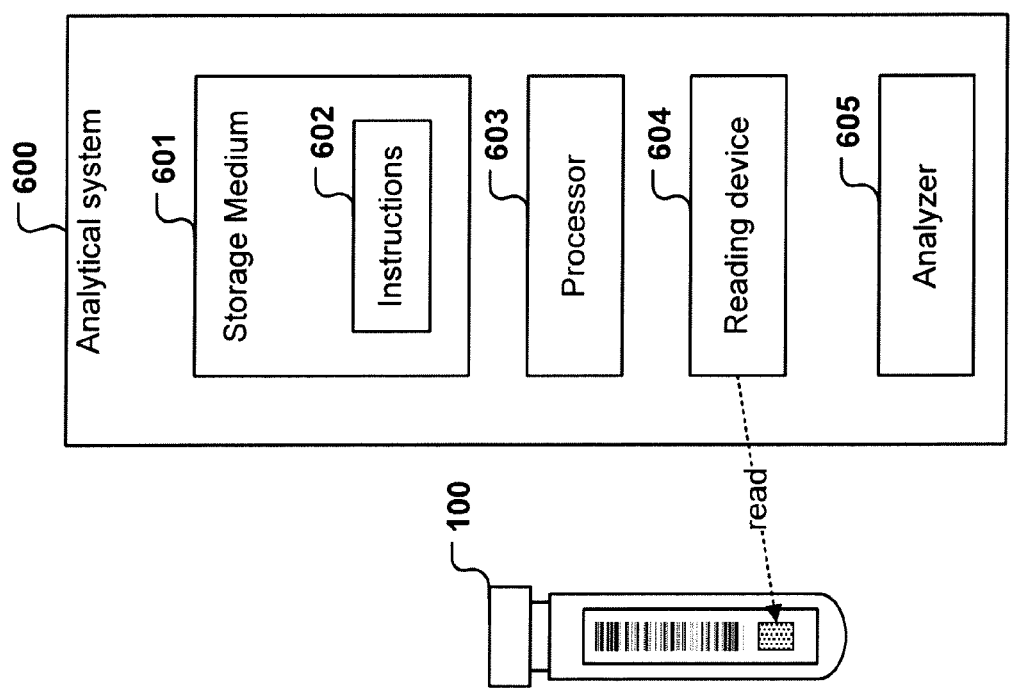

G-FORCE SENSITIVE LABEL AND CORRESPONDING SAMPLE TUBE, METHOD AND ANALYTICAL SYSTEM

BACKGROUND OF THE INVENTION

The invention relates to a g-force sensitive label for detecting and indicating the application of a g-force, a sample tube for centrifuging biological samples comprising the label, an analytical system and a method for determining the centrifugation status of a sample tube comprising a g-force sensitive label.

Pre-analytical systems (sample sorters, centrifuges, etc.) need to know the centrifugation status of a biological sample in order to determine whether a centrifugation step to separate various sample constituents has already been accomplished or not. An additional, unnecessary centrifugation step applied on a sample tube may have a negative impact on the quality of an analysis performed on that sample. For example, many sample tubes used for preparing plasma or serum from whole blood samples comprise a gel for stably keeping the sediment, which can consist of sedimented cells, a particular sedimented cell fraction, a sedimented clot, and the like, separated from the serum or plasma after the serum or plasma has been separated from the sediment. If one or more additional centrifugation steps are carried out on the already centrifuged sample, the gel barrier may be damaged.

Various approaches to automate the task of detecting whether a biological sample tube has been centrifuged or not have been developed: in many laboratories, an Information Technology system ("IT system"), e.g., a LIS or laboratory middleware, is used to control a laboratory workflow, thereby also keeping track of the current centrifugation status of one or multiple biological samples. However, the amount and type of data managed by a laboratory, which is integrated in the laboratory's IT-system, varies between different laboratories. Many laboratories, in particular smaller ones, currently do not integrate data related to the centrifugation state of the samples.

In many laboratories, the centrifugation status is determined by imaging-systems. Manual as well as image-system based approaches are error prone: in the case of blood samples, for example, a slight separation effect can already be observed when a biological sample is left to stand for one hour or longer. As a consequence, image-system based approaches in many cases will wrongly interpret this naturally occurring separation effect of constituents of various biological samples that have been left to stand for a while as the result of an applied centrifugation step. In particular, whole blood samples derived for preparing plasma or serum samples by applying a centrifugation step show significant sedimentation after just one hour of upright sample tube storing; the upper part of the tube will naturally become transparent. Therefore, an optical detector cannot distinguish reliably between a properly centrifuged sample and a plasma sample with naturally occurring sedimentation.

SUMMARY OF THE INVENTION

It is against the above background that the present invention provides certain unobvious advantages and advancements over the prior art, i.e., manual, IT-system based or image-system based approaches to determine the centrifugation status of biological samples. In particular, the inventors have recognized a need for improvements in g-force sensitive labels for detecting and indicating the application of a g-force, sample tubes comprising a g-force sensitive label, methods for determining the centrifugation status of a sample tube, and analytical systems for handling sample tubes comprising a g-force sensitive label.

Although the present invention is not limited to specific advantages or functionality, it is noted that the present invention provides for recording of the centrifugation state of a sample also in laboratories in which centrifugation related data is not integrated in the lab's IT system.

The term "g-force" as used in the following refers to any acceleration force, in particular a centrifugal force acting on objects such as sample tubes being centrifuged. A g-force F caused by accelerating an object of mass m by an acceleration a is calculated as $F=m \times a$. The gravitational force acting on objects in free fall in the direction of the earth's center, which is caused by the gravitational attraction between the mass of the earth and the mass of the object, is referred to as "g-force of 1 g." A centrifugal force is a form of acceleration force executed on a body if the body, e.g., a sample tube in a centrifuge bucket of a centrifuge, is moving a circular path (is centrifuged around a fixed axis). The centrifugal force pushes the body away from the center of the circular path. The higher the centrifugation speed of the centrifuge, usually measured in rotations per minute (rpm) or in meters per second (mps), the higher the centrifugal force executed on the centrifuged body. The unit rpm or mps indicates the number of turns a centrifuge performs per unit of time, e.g., within a minute or within a second. The magnitude of the centrifugal force F given a particular centrifugation speed v is given by the formula $F=mv^2/r$, where m is the mass of the body, e.g., a sample [kg], v is the speed of the body [meter per second], and r is the radius [meter] of the centrifuge. In the following, any kind of force resulting from accelerating an object, in particular a centrifugal force resulting from centrifugation of the sample, will be referred to as "g-force" irrespective of the measurement unit used.

A "sample tube" is a container for centrifuging biological samples comprising an upper end and a lower end. Depending on the embodiment of the invention, the sample tube may in addition be used for collecting, storing and/or analyzing biological samples. Typically, sample tubes are inserted into the buckets of a centrifuge in a way that the centrifugal force acting on the sample tubes during centrifugation acts in the direction from the upper end to the lower end of the sample tube. According to some embodiments of the invention, the sample tube comprises a closure through which sample can be introduced but which prevents sample inside the sample tube from leaving the sample tube.

In one aspect, embodiments of the invention provide for a sample tube which comprises a g-force sensitive label.

Shock sensors are used to protect manufacturers of fragile goods, such as notebooks or other mobile electronic devices, from unjustified warranty claims. Some of the substances and materials used in shock sensors to detect and record a shock event can be used in accordance with embodiments of the present invention to record the application of a g-force. Examples of such sensors are shown and described in U.S. Pat. No. 7,231,804 B1, US Patent App. Pub. No. 2005/0217558 A1, and U.S. Pat. No. 6,848,389 B1, which are expressly incorporated by reference herein.

The g-force sensitive label according to embodiments of the invention can detect and indicate the application of a g-force on the label above a threshold value. The label comprises at least one area comprising or being covered by substance or material having a physical property which measurably changes its state upon applying a g-force above a threshold value on the label. According to particular embodiments of the invention, the label can indicate the application of a g-force on the label in a machine-readable form, e.g., in the form of a 1D or 2D or alpha-numeric code. According to further embodiments of the invention, the label is able to stably indicate the application of a g-force on the label and the object it is attached to.

According to further embodiments of the present invention, the g-force sensitive label is attached to a sample tube or is created as an integral part of the sample tube during manufacturing of the sample tube. According to further embodiments, the g-force sensitive label may be manufactured independent of the manufacturing of the sample tube. In this case, the label comprises at least one attachment area for attaching the label on an object upon which a g-force is to be applied, e.g., a sample tube. The attachment area can be, e.g., an adhesive layer or a layer comprising mechanical fasteners (clips, magnetic strips, and the like). The separation of manufacturing the sample tubes and manufacturing the g-force sensitive label can be advantageous if a particular sample tube has to be centrifuged multiple times. After each centrifugation, a new g-force sensitive label may be attached to the sample tube, thereby providing the option to monitor and document multiple centrifugation steps.

According to further embodiments of the invention, the attachment layer of the g-force sensitive label is made of material allowing the reversible attachment of the g-force sensitive layer to an object, in particular a sample tube. Such embodiments are advantageous as they allow for repeated use of the same g-force sensitive labels provided the label provides a "reset-functionality." The reset-functionality comprises at least the step of changing the physical properties of the g-force sensitive area of the g-force sensitive label in a way that it largely corresponds to the physical state of the g-force sensitive label before a g-force above a threshold value was applied on the label. According to further embodiments of the invention, the reset-functionality may further comprise the option to erase data stored in non-g-force sensitive areas of the label. For example, a permanently visible bar code printed via eInk technology on a non-g-force area of the label next to the g-force sensitive area may comprise patient related data, e.g., in the form of a bar code. An exemplary embodiment of the eInk technology is described in WO 2003/089250 A2, which is expressly incorporated by reference herein. The step of resetting the label after centrifugation may comprise a first step for resetting the state of the g-force sensitive area resulting in a disappearance of the machine-readable code in that area. The step of resetting the label after centrifugation may in addition comprise the step of applying an electric field resulting in the erasing of the non-g-force sensitive bar-code printed with eInk technology, thereby also erasing patient-related, sensitive information which may be stored in the non-g-sensitive eInk bar code. The type of resetting technology to be applied depends on the respective technology employed by each embodiment of a g-force sensitive label, in accordance with the present invention.

The option to reset and re-use a g-force sensitive label comprising a reversibly attachable layer can be particularly advantageous, as it allows the creation of complex and comparatively expensive labels which do not have to be discarded after their first use. According to a further embodiment, an additional beneficial aspect of a g-force sensitive label being reversibly attachable is that it allows monitoring multiple repeated centrifugation steps applied on a sample, e.g., by exchanging the g-force sensitive label after each centrifugation step applied to a sample.

According to further embodiments of the invention, the g-force sensitive area may by attached to the g-force sensitive label via a layer comprising a material allowing the reversible attachment of the g-force sensitive area to the g-force sensitive label.

According to some embodiments of the present invention, the g-force sensitive label can comprise at least one area which, upon application of a g-force above a threshold value, alternates a pattern displayed in the at least one area such that the altered pattern can be read by a reading device. According to embodiments of the invention, the pattern displayed on the g-force sensitive area changes after the application of a g-force to display 1D or 2D or alpha-numeric code. A 1D (one dimensional) code comprises a sequence of lines or dots of varying width. A 1D code can be, for example, a bar code, wherein a sequence of lines of a particular height and of varying width is separated by spaces of constant width. A 2D code is a machine-readable code comprising machine-readable information encoded in two dimensions, e.g., a matrix code. An alpha-numeric code as used in the following is any other code being machine-readable, e.g., a particular set of numbers or symbols or a particular pattern which can be decoded by a reading device.

According to typical embodiments of the present invention, the threshold value of a g-force causing a change in the pattern displayed on the g-force sensitive area of the g-force sensitive label is a g-force above about 500 g (g-force 500 times higher than force caused by the earth's gravity acceleration). A g-force above this threshold value is considered appropriate for successful separation of the sediment "cell fraction" and "plasma", as well as for separation of the sediment "clot" and "serum" when centrifuging blood samples. According to further embodiments, the g-force sensitive area can comprise different kinds of materials or substances whose physical properties change upon application of a g-force above another threshold value. These embodiments can be particularly advantageous for pre-analytical systems performing other pre-analytical tasks.

According to further embodiments of the present invention, the g-force sensitive label comprises at least one area comprising or being covered by materials or substances whose physical properties measurably change in proportion to the duration of the application of a g-force above a threshold value. Alternatively, the materials or substances being part of or covering the g-force sensitive area may be arranged on that area in a way that allows for the indication of more than two different centrifugation states, each state corresponding to a different code displayed on the g-force sensitive area. Different centrifugation states can result from different centrifugation time and/or different strength of the applied g-force. In a further advantageous aspect of embodiments of the present invention, g-force sensitive labels recording the centrifugation time as well as the strength of the applied g-force allow a recording of the integrated g-force applied on the g-force sensitive label over a particular period of time.

These embodiments are advantageous in that they are not limited to indicating that a particular g-force above a threshold value has been applied at least once. In addition, the labels may further indicate the approximate strength of the applied g-force and/or the approximate time during which a g-force above a threshold value acted on the g-force sensitive label. This information may help to determine whether a centrifugation step was aborted abnormally and therefore has to be repeated, or whether the duration of the centrifugation step was too long or the applied g-force too strong to guarantee the quality of an analysis applied on a particular sample.

In accordance with yet another embodiment of the invention, a method for determining the centrifugation status of a sample tube comprising the g-force sensitive label is provided. The method comprises determining the centrifugation status of a sample tube by reading with a reading device the g-force sensitive label that is part of or attached to the sample tube. The reading device can be, e.g., a bar code reader or any other device that can read the 1D or 2D or alpha-numeric code on the g-force sensitive label indicating the application of a g-force.

According to further embodiments of the invention, the method further comprises determining whether a sample tube has been centrifuged to a predetermined degree that is appropriate for later withdrawing serum or plasma from the sample tube. According to embodiments of the invention, the predetermined degree being appropriate for withdrawing serum or plasma is specified by applying a centrifugal force of above about 500 g for about 5 minutes. These parameters may vary depending on the specific needs of a laboratory, the manufacturer of the sample tube, the substances added to the sample tube, and a multitude of other factors. According to further embodiments of the invention, the g-force sensitive label can in addition indicate whether the g-force has been applied for a longer time than a particular maximum value.

According to further embodiments, the g-force sensitive label can be configured to indicate whether the duration of a centrifugation step and the g-force applied on a sample tube during that centrifugation step is appropriate for separating serum or plasma from the sediment. In this case, the serum or plasma is withdrawn from the sample tube after the centrifugation step. According to further embodiments, the method further comprises analyzing the withdrawn serum or plasma for the presence of one or more analytes with an analyzer. For example, a fully automated sample workcell system could load tubes holding whole blood samples into a centrifuge. The tubes can comprise a g-force sensitive label that is configured to indicate whether the sample has been centrifuged to a predetermined degree appropriate for separating the sediment from the serum or plasma. The centrifuge could be started automatically after the loading step. The centrifuge can be programmed to apply a particular centrifugal force for a particular period of time considered appropriate for separating the sediment from the serum or plasma. After the centrifugation step is finished, the centrifuged sample may be automatically loaded onto a conveyor belt and transported to a bar code reader that reads the g-force sensitive label before any other step is executed. The step of reading the g-force sensitive label, in particular the machine-readable code being displayed upon application of g-force, guarantees that the samples used for further analysis have g-force sensitive labels that indicate the centrifugation step was applied appropriately for separating serum or plasma from the sediment. In case it is detected that the sample tube was not centrifuged to the predetermined degree, a non-analytical process step is applied on the sample tube comprising, e.g., the labeling of the sample tube in order to indicate that an error occurred during the centrifugation process. This non-analytical process can also comprise discarding the sample tube, transporting the samples to an output position where they can be fetched by the operator, and the like.

In a further aspect, embodiments of the present invention relate to an analytical system comprising a reading device, e.g., a bar code reader, for reading a g-force sensitive label on a sample tube, wherein the g-force sensitive label is indicative of whether or not the sample tube has been centrifuged. The analytical system can further comprises at least one analyzer for analyzing sample tubes, a processor, a computer readable non-transitory storage medium such as a CD-ROM, a hard disk drive, a flash drive, magnetic or optic memory devices, and the like. The computer readable storage medium can comprise instructions for processing the information encoded in the 1D or 2D or alpha-numeric code. That information is read by the reading device from the g-force sensitive label. By the processor executing the computer readable instructions, the analytical system is operable to determine whether a sample tube comprising a g-force sensitive label has been centrifuged to a predetermined degree that is appropriate for withdrawing serum or plasma from the sample tube. The analytical system can be further operable to initiate an analysis executed by the at least one analyzer on serum or plasma having been withdrawn from the sample, in case it was determined that the sample had been centrifuged to a predetermined degree appropriate for a particular analysis. In case the label indicates that the sample had not been centrifuged to the predetermined degree, a non-analytical process step is executed by the analytical system on the sample tube. According to some embodiments of the analytical system in accordance with the present invention, the non-analytical process step comprises transferring the sample tube to an output position from where the sample can be taken by an operator. According to other embodiments, the sample tube can be discarded or the whole pre-analytical workflow could be halted.

In a further aspect, embodiments of the present invention relate to a g-force sensitive label for detecting and indicating the application of a g-force. The label comprises at least one area for detecting and indicating an application of g-force above a threshold value on the label. The at least one area comprises or is covered by a material or substance having at least one physical property which stably and measurably changes its state upon applying a g-force above a threshold value. As a result, the g-force sensitive area stably and measurably changes its state upon applying a g-force above the threshold value, thereby altering a displayed pattern such that a machine-readable 1D or 2D or alpha-numeric code is stably displayed. The g-force sensitive label further comprises at least one attachment area for attaching the label on an object, e.g., a sample tube. The attachment area can be, for example, an adhesive layer or one or multiple adhesive strips on the back side of the label. The attachment area could also comprise one or multiple bulges and/or depressions that are shaped to be specifically attachable to a particular object.

The term "stably" indicates that the time period within which the g-force sensitive label displays the code in a machine-readable way is significantly longer than the time period within which it can be expected in practice that a reading step is applied by the reading device. Typically, the term "stably" means that the 1D or 2D or alpha-numeric code is displayed at least several months after a g-force of a particular threshold value has been applied. According to further embodiments wherein it can be surely assumed that the sample tubes will be discarded shortly (within some few hours or days) after having applied a centrifugation step, the phrase "stably" may also refer to significantly shorter time periods (i.e., a few hours, days or weeks). According to some embodiments, the attachment area is made of a material that releasably attaches the label to an object. According to further embodiments of the invention, the g-force sensitive area displaying the machine-readable code after applying a g-force above a particular threshold value is attached releasably to the g-force sensitive label. By exchanging the g-force sensitive label or the g-force sensitive area after applying a centrifugation step, it is possible to monitor the application of multiple centrifugation steps.

According to some embodiments of the present invention, the g-force sensitive label is configured to indicate the application of a g-force above a certain threshold value irrespective of the direction of the applied g-force. This kind of g-force sensitive label may be part of or attached to the sample tube in any position, provided that the reading device can read the code displayed after the application of the g-force. According to other embodiments, the g-force sensitive label is operable to indicate the application of a g-force above a predefined threshold value only in case the g-force acts in the direction from the upper part of the g-force sensitive label to the lower part of that label. In this case, the g-force sensitive label can be integrated into or attached onto the sample tube in a way which ensures that the upper part of the g-force sensitive label faces towards the upper part of the sample tube and the lower part of the label faces towards the lower part of the sample tube.

According to further embodiments of the invention, the g-force sensitive label may further comprise at least one second area being operable to automatically detect and indicate additional environmental conditions possibly affecting the quality of an analysis such as storage temperature, centrifugation temperature, and the like. The g-force sensitive label may further comprise one or multiple third areas displaying further properties of the sample or the sample tube such as the tube type, sample type, sample identifier, patient related data, and the like. The information displayed on the at least one third area does not depend on the application of a g-force and is displayed permanently, e.g., in the form of a second 1D, 2D, or alpha-numeric code.

According to still further embodiments of the present invention, the 1D or 2D or alpha-numeric code that is displayed upon applying a g-force above a particular threshold value on the g-force sensitive label may encode additional data such as the tube type, sample type, sample identifier, and the like. According to these embodiments, the g-force sensitive label may or may not contain in addition a non-g-force sensitive code.

According to yet still further embodiments of the present invention, the g-force sensitive label can comprise a 1D or 2D or alpha-numeric code that is displayed upon applying a g-force above a particular threshold value, in combination with a non-g-force sensitive code and/or a RFID-tag comprising sample- or patient-related data and/or a temperature-sensitive label. A container for transporting and pouring substances comprising an RFID tag is described in, e.g., US 2010/0032437 A1, which is expressly incorporated by reference herein. By combining the advantageous features of RFID tags and embodiments of the g-force sensitive labels according to embodiments of the present invention, sample tubes or other objects according to embodiments of the invention can be provided with a multitude of means to record and/or store physical conditions having acted on an object, e.g., a sample tube.

According to further embodiments, the g-force sensitive label may comprise multiple g-force sensitive areas displaying a 1D or 2D or alpha-numeric code upon application of g-forces above different threshold values.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 2b illustrates the application of the g-force on the sample tube of with gel shown in FIG. 2a;

FIG. 3a illustrates a g-force sensitive label in accordance with an embodiment of the present invention in bird's eye view;

FIG. 3b depicts a part of a first g-force sensitive label in accordance with an embodiment of the present invention in cross-section view;

FIG. 3c depicts a part of a second g-force sensitive label in accordance with an embodiment of the present invention in cross-section view;

FIGS. 4a-c depict a part of a third g-force sensitive label in accordance with an embodiment of the present invention in cross-section view in three different centrifugation states;

FIGS. 4d-e depict a part of a fourth g-force sensitive label in accordance with an embodiment of the present invention in cross-section view in two different centrifugation states;

FIGS. 5d-e depict a seventh g-force sensitive label in accordance with an embodiment of the present invention in cross-section view in two different centrifugation states;

FIG. 6a depicts an analytical system in accordance with an embodiment of the present invention;

FIG. 6b depicts a g-force sensitive label comprising an adhesive layer in accordance with an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present invention.

DETAILED DESCRIPTION OF THE INVENTION

In order that the invention may be more readily understood, reference is made to the following examples, which are intended to illustrate the invention, but not limit the scope thereof.

It is noted that terms like "preferably", "commonly", and "typically" are not utilized herein to limit the scope of the invention or to imply that certain features are critical, essential, or even important to the structure or function of the claimed invention. Rather, these terms are merely intended to highlight alternative or additional features that may or may not be utilized in a particular embodiment of the present invention.

Figure 1C:
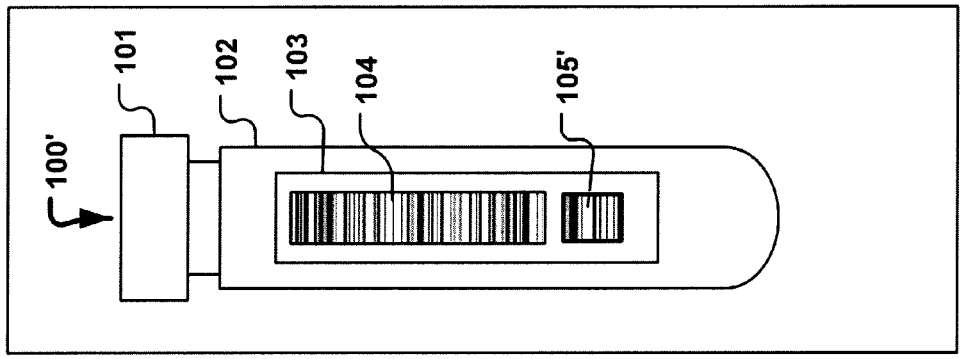
FIG. 1c illustrates a spun sample tube comprising a g-force sensitive label in accordance with an embodiment of the present invention.
Figure 1B:
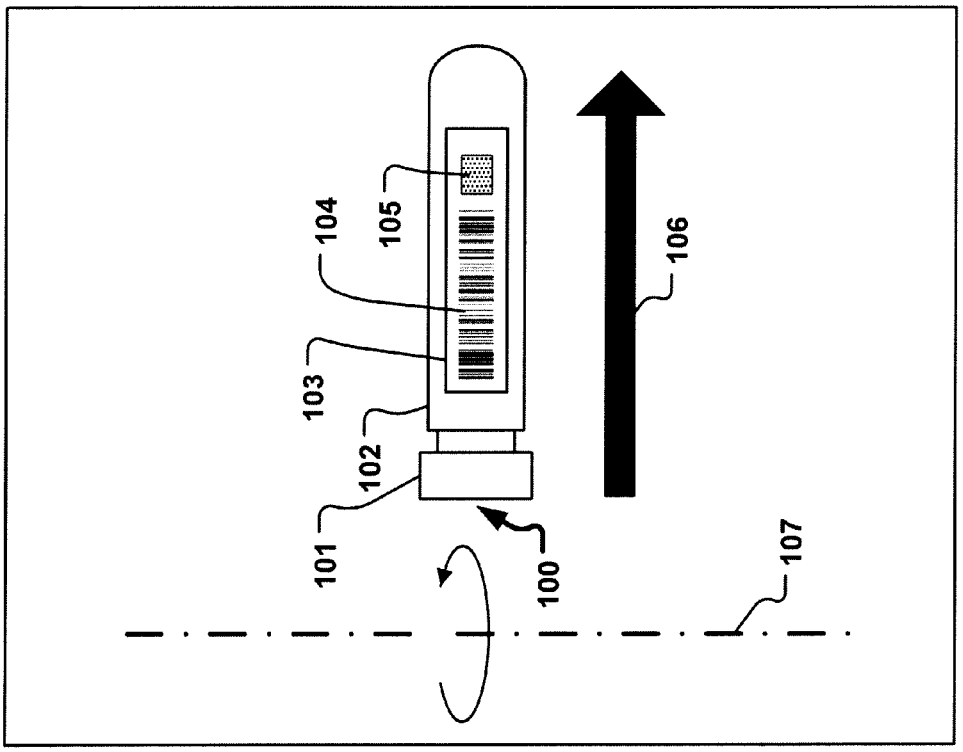
FIG. 1b illustrates the application of a g-force on a sample tube.
Figure 1A:
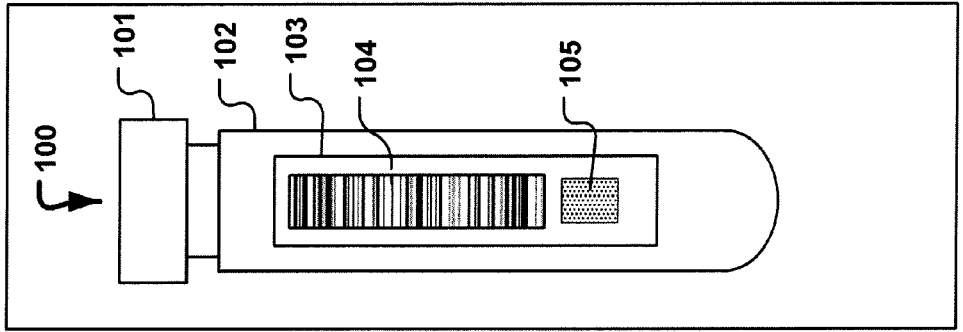
FIG. 1a illustrates a sample tube comprising a g-force sensitive label in accordance with an embodiment of the present invention.

FIG. 1a depicts an unspun sample tube 100 comprising a cap 101, a shank 102 and a g-force sensitive label 103 comprising a g-force sensitive area 105. The g-force sensitive label further comprises a non-g-force sensitive area with a bar code 104. FIG. 1b depicts the application of a g-force 106 on the sample tube 100 by rotating the sample tube around the axis 107, which could, for example, be the axis of a centrifuge. The direction of the applied g-force is from the upper part of the sample tube to the lower part of the sample tube. FIG. 1c depicts the sample tube 100 after the application of the g-force above a threshold value. In FIGS. 1a-2c, the reference number 100 refers to the unspun sample tube, and reference number 100' refers to the spun sample tube. The pattern displayed by the g-force sensitive area 105 has changed as a result of applying the g-force, and a bar code is displayed in area 105'.

Figure 2C:
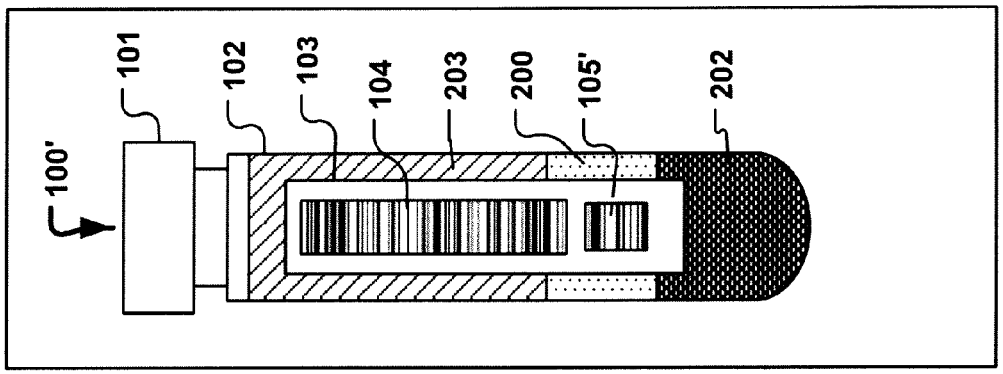
FIG. 2c illustrates a spun gel sample tube comprising a g-force sensitive label in accordance with an embodiment of the present invention.
Figure 2B:
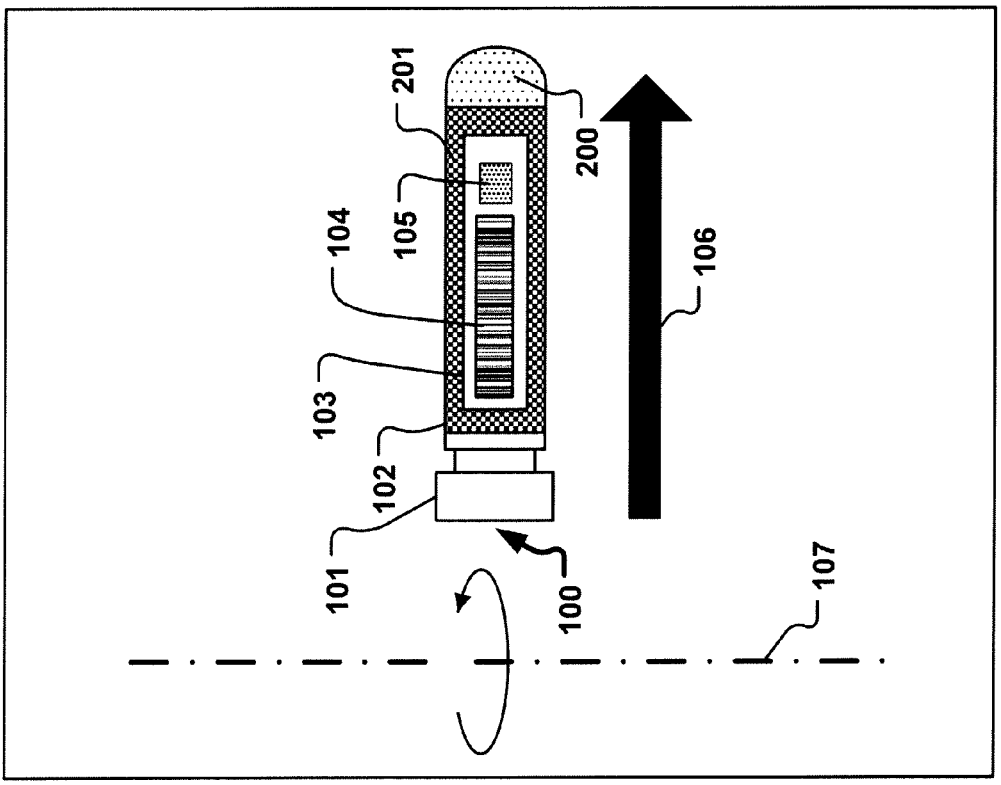
Figure 2A:
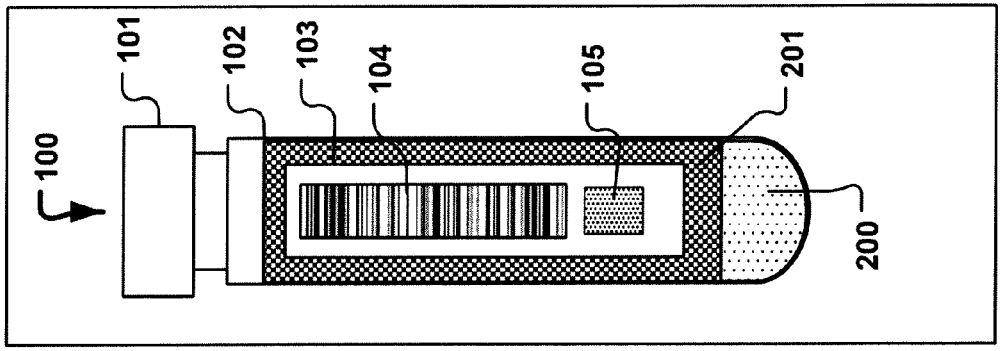
FIG. 2a illustrates a sample tube with gel comprising a g-force sensitive label in accordance with an embodiment of the present invention.

FIG. 2a depicts an unspun sample tube 100 comprising a gel 200 at the bottom of the sample tube. The sample tube is filled with whole blood 201 of a patient. After applying the g-force of about 500 g for at least 5 minutes as indicated in FIG. 2b by the black arrow 106, a sediment 202 and a serum fraction 203 appear as separate fractions (FIG. 2c). The gel 200' stably separates the sediment and serum fractions 202, 203. In case the sample tube 100' should be tilted, a mixing of sediment and serum is prohibited by the gel 200'.

FIG. 3a depicts a g-force sensitive label 103 comprising a non-g-force sensitive area 104 with a bar code indicating, for example, a patient ID, a sample tube ID, the sample type, and/or a requested analysis. The label 103 further comprises a g-force sensitive area 105 displaying a first pattern, which is shown as a homogeneously dotted area. The g-force sensitive label depicted in FIG. 3a has not yet been subjected to a g-force above a threshold value. The dotted square of section 303 indicates an area surrounding the area 105, which will be discussed in detail for various embodiments of g-force sensitive labels in FIGS. 3b-4e, wherein that part of the label is displayed in cross-section view. The side of the label visible in FIG. 3a from the bird's eye view corresponds to the left side of the embodiments of g-force sensitive label depicted in FIGS. 3b-4e in cross-section view.

The g-force sensitive label 301 depicted in FIG. 3b comprises a first housing 304 located below a transparent window 306. As long as a g-force above the threshold value is not applied on the label, the first housing 304 is empty. The upper and lower border of the transparent window 306 indicated by black squares corresponds to the upper and lower end of area 105 depicted in FIG. 3a. The color of the back wall 305 of the first housing 304 is a first color. The side of the transparent window 306 facing the outside of the label (according to FIG. 3b: the left side of the transparent window) further comprises an opaque 1D or 2D or alpha-numeric code indicated by multiple code bars 311 depicted in cross-section view. The opaque code may likewise be a first color or a color not contrasting with the first color. The term "color" will in the following refer to colors in the strict meaning of the word but also to any shades of grey, including black or white color. Opaque code 311 may, for example, have been printed on the transparent window 306 or may likewise be an integral part of the transparent window. The g-force sensitive label 301 further comprises a second housing 307 containing an indicator material that is a second color. The second color contrasts with the first color. The material of the second housing 307 may be a fluid, a powder, a set of particles, a suspension, or any other form of matter that is capable of passing from the second housing 307 into the first housing 304 via the channel 309 provided that channel 309 is not clogged by another substance or material.

The second housing 307 is positioned relative to the first housing 304 in a way that the first housing 304 is located at the lower end of the g-force sensitive label and the second housing 307 is located at the upper end of the g-force sensitive label 301. The g-force sensitive label 301 is part of or attached to a sample tube in a way that the upper end of the g-force sensitive label faces the upper end of the sample tube and the lower end of the label 301 faces the lower end of the sample tube. Channel 309 connects the second housing 307 with the first housing 304. The channel 309 comprises a material or substance which clogs the channel 309 as long as a g-force above a material-specific threshold value has not been applied on that g-force sensitive label. As a result, the filling material contained in second housing 307 is prohibited from entering the first housing 304 as long as a g-force above the threshold value is not applied on the g-force sensitive label. In case the g-force above the threshold value is applied on the label 301, the g-force sensitive material clogging channel 309 disintegrates or becomes porous. Provided that the g-force acts in the direction from the upper part of the label 301 to the lower part, the filling material contained in the second housing 307 passes through the channel 309 and enters the first housing 304. As a result, the code bar 311 becomes visible and can be read by a reading device, e.g., a bar code reader.

As long as the filling material of the second color was contained in the second housing 307, the code 311 on the transparent window 306 does not contrast with the back wall 305 because both were a first color or a color not contrasting with the first color. After applying the g-force above the threshold value, the channel 309 is opened and the indicator material having the second color enters the first housing 304. As a result, the first color of the bar code 311 contrasts with the second color of the indicator material and becomes visible through the transparent window 306.

According to further embodiments, the channel 309 does not comprise force-sensitive, clogging material. Rather, the filling material within second housing 307 is attached to one or more interior walls of the second housing in a force-sensitive way, allowing the detachment of the filling material upon the application of a sufficiently high g-force. Attaching the filling material in a g-force sensitive way may comprise the usage of force sensitive adhesives such as natural or synthetic rubbers, polyolefines, silicones, polyvinyl ethers, etc.

The g-force sensitive label 302 depicted in FIG. 3c comprises a first housing 304', a transparent window 306', an opaque 1D or 2D or alpha-numeric code 312 on top of or within the transparent window 306' (the code 312 being a first color), a second housing 308, and a channel 310. As long as a g-force above a threshold value has not been applied on label 302, the channel 310 is clogged by a force sensitive material. Before the g-force is applied on the label 302, the first housing 304' is filled with material of a first color or of a color not contrasting with the first color, and second housing 308 is empty. Upon application of g-force above the threshold value, the material clogging channel 310 disintegrates or becomes porous, the material contained in the first housing leaves the first housing 304' and enters the second housing 308. As a result, the code 312 becomes visible because the first housing 304' has become empty, and a back wall 305', which is of a second color contrasting with the first color, becomes visible. In order that the material contained in the first housing 304' can enter the second housing 308 upon application of a g-force above threshold value, the second housing 308 faces the lower end of the label 302 while the first housing 304' faces the upper end of the label 302, the upper end of the label faces towards the upper end of the sample tube, and the lower end of the label 302 faces the lower end of the sample tube. The embodiment depicted in FIGS. 3b and 3c provides a g-force sensitive label that displays a 1D or 2D or alpha-numeric code upon applying a g-force above a threshold value. By choosing an appropriate clogging material for channels 309 or 310 that disintegrates upon the application of a g-force of a different strength, a multitude of different g-force sensitive labels specially adapted for a multitude of different g-force strengths and for different pre-analytical procedures can be created.

FIGS. 4a, 4b and 4c depict a further g-force sensitive label 401 in three different centrifugation states. The g-force sensitive label 401 comprises at least two layers, wherein the first layer comprises a transparent window 306", and the second layer comprises a first housing 304" and at least an upper extension 403. The term "layer" does not necessarily imply that the label was manufactured by adding separate, different layers. The term "layer" merely specifies a particular three-dimensional compartment within the label wherein the first compartment completely lies above the adjacent, second compartment resulting in a corresponding spacial separation of all components of the respective compartments. FIG. 4a depicts the g-force sensitive label 401 in a centrifugation state according to which a g-force above a threshold value has not been applied yet (i.e., the unspun state) of the label 401. The label comprises the transparent window 306" and the first housing 304", the first housing having an upper extension 403, a lower extension 404, and a sliding pane 402. FIG. 4a depicts the unspun state of the label 401 corresponding to the sliding pane 402 being in its initial position within the upper extension 403. A 1D or 2D or alpha-numeric code 405 is not visible through the transparent window 306" in the unspun state. The code 405 is a first color contrasting with a second color of sliding pane 402.

Likewise, the material of the sliding pane 402 may also be transparent provided that the back wall 305" of the first housing 304" below the transparent window 306" is a second color. The code 405 in FIGS. 4a-4c is depicted in cross-section. According to the depicted state, the sliding pane 402 is attached to one or both inner walls of the upper extension 403 in a way that the sliding pane 402 is released only when a g-force above the threshold value is applied on the label. For example, the space between the sliding pane 402 and the walls of the upper extension 403 could be filled with material that deteriorates upon application of the g-force. Likewise, the inner walls of the upper extension 403 could exercise a mechanical pressure upon the sliding pane 402, thereby holding the sliding pane 402 in place as long as a g-force above the threshold value does not act on the sliding pane 402 in the direction to the lower extension 404.

FIG. 4b depicts the g-force sensitive label 401 in a centrifugation state according to which a g-force above the threshold value has been applied or is currently applied on the label in the direction from the upper extension 403 to the lower extension 404, which results in the sliding pane 402 breaking free and a movement of the sliding pane 402 out of the upper extension 403 of the first housing into the first housing 304". As a result, the code 405 imprinted on the sliding pane becomes visible through the transparent window 306" and can be read. The first housing 304" and the upper and lower extension 403, 404 may be filled with a material exercising a friction force on the moving sliding pane 402 resulting in a more or less constant sliding speed of the sliding pane 402 in the direction from the upper extension 403 to the lower extension 404. That material could, for example, be a viscous fluid gel. Likewise, one or both sides of the sliding pane 402 may be covered with material having adhesive or other properties resulting in an adhesion and/or attraction between the material of the sliding pane 402 and the material of one or both walls of the upper and lower extension 403, 404 and the first housing 304". As a result, the sliding pane 402 moves with almost constant velocity from the upper extension 403 into the first housing 304" and from the first housing into the lower extension 404 when a g-force above the threshold value is applied on the label.

Some embodiments may lack the lower extension 404. Correspondingly, some embodiments can only indicate two different centrifugation states as depicted in FIGS. 4a and 4b if one ignores the intermediate states wherein the sliding pane 402 has not fully entered the first housing 304" below the transparent window 306". According to typical embodiments, however, the invention comprises also a lower extension 404 supporting a third centrifugation state as depicted in FIG. 4c. These embodiments allow for specifying minimum required centrifugation duration and a maximum allowed centrifugation duration to be recognized and indicated by the g-force sensitive label 401. The first (4a), second (4b), and third (4c) centrifugation states may correspond to a too short, an appropriate, and a too long centrifugation duration, respectively. In case a g-force is applied on the g-force sensitive label 401 according to an appropriate centrifugation duration, the code 405 specified on the sliding pane 402 will be displayed somewhere below the transparent window 306", as depicted in FIG. 4b. The size/height of the transparent window/g-force sensitive area 105 may be significantly larger than the size of the code 405, thereby specifying the allowed range of centrifugation times. In case a g-force above the threshold value acts on the g-force sensitive label for a longer period of time, the sliding pane 402 will move into the lower extension 404. As a result, the code 405 will partly or completely be hidden. According to other typical embodiments, the sliding pane 402 further comprises a special mark 406, for example, on its upper end, the special mark 406 being, e.g., a third color contrasting with the first and the second color. The special mark can be used to discriminate the centrifugation state according to FIG. 4a (unspun) from the centrifugation state according to FIG. 4c (spun for too long). In FIG. 4a, the code 405 is not visible through the transparent window 306" because the sliding pane 402 is within the upper extension 403 (unspun). In FIG. 4c, the code 405 is not displayed because the sliding pane 402 is located within the lower extension 404 because the g-force has been applied for a time long enough to allow the sliding pane 402 to move completely into the lower extension 404. According to yet other typical embodiments, the lower extension 404 is shorter than the sliding pane 402 and as a result the special mark 406 is still visible through the transparent window 306" indicating that the g-force has been applied on the label for a long time. The visibility of special mark 406 may therefore indicate that a sample tube comprising a g-force sensitive label 401 has been centrifuged for too long and that the quality of an analysis applied on that sample may be negatively affected.

FIG. 4d depicts section 303 of the g-force sensitive label 410 in an unspun centrifugation state, while FIG. 4e depicts that section in spun a state after a g-force above a first threshold value was applied in cross-section view. Label 410 is a multi-layer label comprising a first layer containing within the area 105 a transparent window 306''', and at least a second layer. The second layer comprises a first housing 304''' having a back wall 305''' comprising a 1D or 2D or alpha-numeric code 409 on that side of the back wall 305'' facing the first housing. The first housing has a lower extension 404 facing towards the lower end of the label. A sliding pane 408 is located within the first housing 304''' as long as the g-force above the threshold value has not been applied on the g-force sensitive label, thereby hiding the code 409 on the back wall, the sliding pane 408 leaving the first housing and moving into a lower extension 404 upon a g-force above the threshold value acting on the g-force sensitive label, thereby making the code 409 on the back wall 305'' of the first housing visible through the transparent window 306'''.

The back wall of the first housing and the first housing are referred to in the four embodiments depicted in FIGS. 3b, 3c, 4a-4c, and 4d-4e with the reference numbers 305 and 304, 305' and 304', 305'' and 304'', and 305''' and 304''', respectively.

The embodiments of the inventions depicted in FIGS. 3b-4e may, for example, be reset by applying a g-force in the opposite direction to the depicted g-force sensitive labels or objects having attached such a label. According to embodiments of the invention wherein a substance passes a channel 309 or 310 upon application of a g-force above a first threshold value, as depicted, e.g., in FIGS. 3b and 3c, such embodiments could comprise a g-force-sensitive switch instead of the g-force dependent material disintegrating or becoming porous upon applying a g-force above a threshold value. The switch can be configured to pivot around a hinge axis in two directions in case a g-force above a particular threshold value is applied on the label. In case a g-force above a threshold value acts in a top-down direction, the switch turns downward and releases substances contained in the upper housing into the lower housing. In case the g-force is applied in a bottom-up direction, the switch turns upward and releases substances contained in the lower housing into the upper housing.

Figures 5A, 5B, 5C:
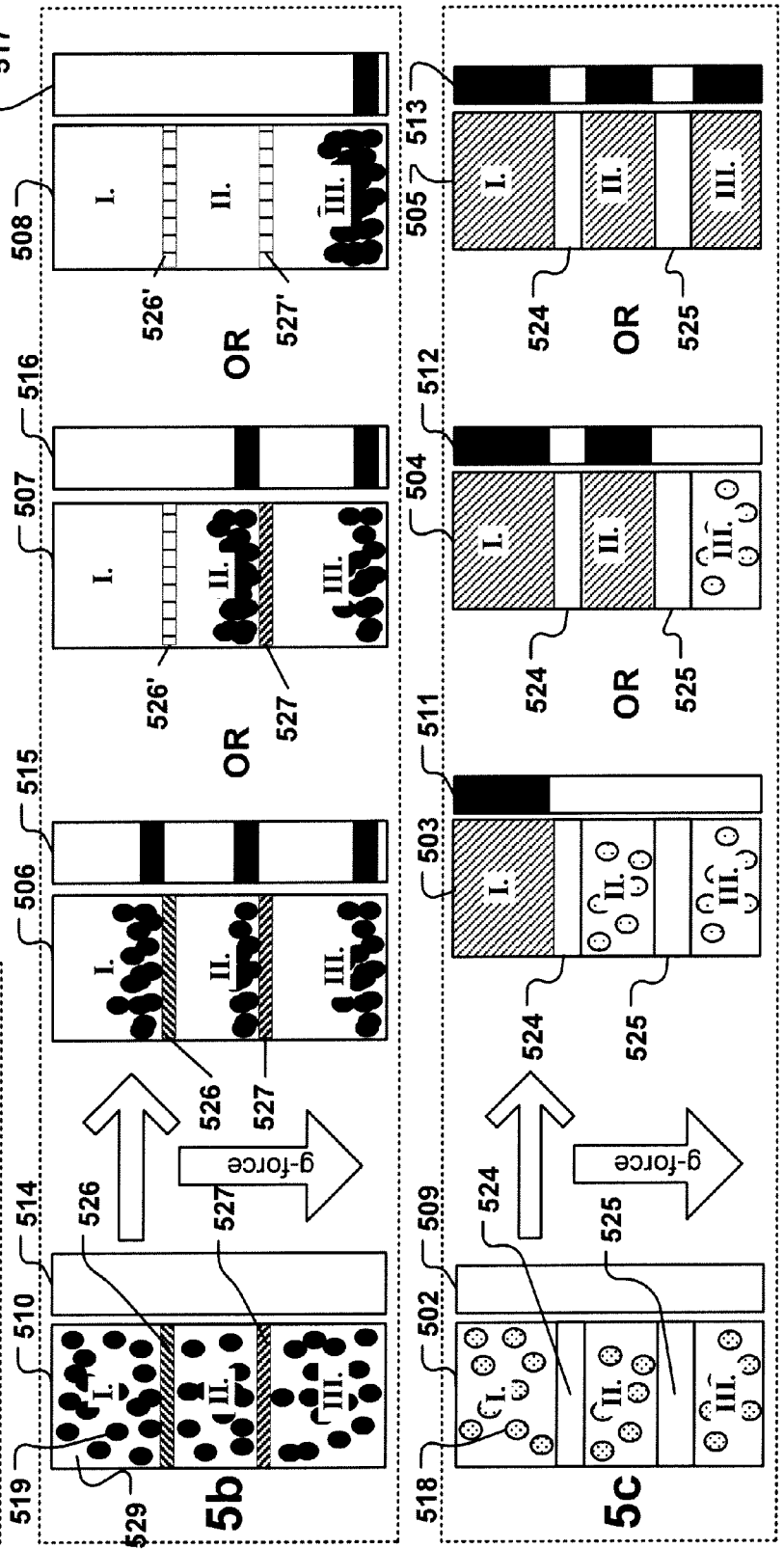
FIG. 5a depicts a fifth g-force sensitive label in accordance with an embodiment of the present invention in bird's eye view.
FIG. 5b depicts a sixth g-force sensitive label in accordance with an embodiment of the present invention in various different centrifugation states and corresponding bar codes.
FIG. 5c depicts a sixth g-force sensitive label in accordance with an embodiment of the present invention in various different centrifugation states and corresponding bar codes.

FIG. 5a depicts a g-force sensitive area of a g-force sensitive label in an unspun state displaying a first pattern 501. The pattern 502 illustrates the g-force sensitive area in a spun state after applying a g-force above a threshold value, which differs from the first state. The g-force sensitive area displaying first pattern 501 of the embodiment depicted in FIG. 5a comprises or is covered by a layer containing metal filings 519 that are approximately homogeneously distributed within a filling material 529. The filling material is immobilized. The filling material is non-metallic (e.g., organic, silica-based) and is operable to stably hold the metal filings in place as long as the g-force is not applied. In case a g-force is applied, the metal filings move in the direction of the applied g-force until they reach the lower end of the area resulting in a distribution of metal filings as displayed in a pattern 502. The lower end of the area 105 comprises a layer that cannot be passed by the metal filings. As a result, the metal filings accumulate on the lower end of the area 105 in a pattern 502 just above that layer or barrier. When the metal filings are large enough and the color of the filling material 529 contrasts with the color of the metal filings 519, an optical sensor may be used to discriminate between the pattern 501 and the pattern 502, thereby indicating two different centrifugation states (501: unspun; 502: spun).

The single line indicated in pattern 502 can be considered as a simple form of a bar code. Alternatively, or in addition, a metal sensor and/or a Hall-effect sensor may be used to read the new pattern 502. In case metal filings are used in an embodiment of the invention being based on functional principles depicted, e.g., in FIGS. 5a and/or 5b, a strong magnet can be used to reset the 1D or 2D or alpha-numeric code displayed on the g-force sensitive area of a g-force sensitive label after the application of a g-force above a first threshold value. As a result, the g-force sensitive label may be used multiple times.

FIG. 5b depicts a further embodiment of area 105 in four different centrifugation states corresponding to four different patterns: 510, 506, 507, 508. The area 105 comprises a multitude of metal filings 519 that are approximately homogeneously distributed within the filling material 529. Pattern 510 corresponds to an unspun state while patterns 506-508 correspond to three different spun states. The g-force sensitive area depicted in FIG. 5b comprises two or more sub-areas I, II and III. The filling material 529 corresponds in its properties to the filling material described in FIG. 5a and is the same in all sub-areas I-III. Each sub-area is separated by a layer of barrier material from the next sub-area. Sub-area I is separated from sub-area II by a barrier 526 and sub-area II is separated from sub-area III by a barrier 527.

According to typical embodiments, the barriers 526 and 527 are of the same color as the sub-areas to avoid the erroneous interpretation of a barrier as a bar of a bar code by an optical reader. The barrier material in the barrier 526 is different from the barrier material in barrier 527. The material in each of those barriers 526 and 527 is force sensitive and disintegrates or becomes porous upon applying a g-force of a particular, material-specific threshold value. Empty rectangle 514 illustrates that the reading device is not able to detect any machine-readable code in pattern 510, because the metal filings are distributed in the g-force sensitive area almost homogenously. As long as a g-force above a first threshold value is not applied, no machine-readable code can be read. Upon application of a g-force above the first threshold value in the direction from the upper to the lower end of the label, the metal 519 filings become detached from the filling material in the sub-areas I-III. As a result, the metal filings are distributed in area 105 as depicted in 506.

G-force sensitive area 105 displaying the pattern 506 indicates a second centrifugation state according to which a g-force above a first threshold value (which is the threshold above which the metal filings become detached from the filling material) and below a second threshold value (which is the threshold above which the material of barrier 526 disintegrates or becomes porous) was applied on the g-force sensitive label, the second threshold value being higher than the first threshold value. As the metal filings have detached from the filling material in all sub-areas I-III and as the barriers 526 and 527 cannot be passed by the metal filings, the metal filings of each sub-area accumulate just above the barrier on the lower side of their respective sub-area. As a result, a reading device can read a bar code 515 comprising three bars just above the barrier layers of area 105.

G-force sensitive area 105 displaying the pattern 507 indicates a third centrifugation state according to which a g-force above the first and second threshold values, but below a third threshold value (which is the threshold above which the material of barrier 527 disintegrates or becomes porous) was applied on the g-force sensitive label. As the metal filings have detached from the filling material in all sub-areas I-III and as the barrier 526 has disintegrated or become porous while barrier 527 still cannot be passed by the metal filings, the metal filings of sub-areas I and II accumulate just above the barrier 527. As a result, a reading device can read a bar code 516 comprising two bars just above the barrier layer 527 and just above the lower end of sub-area III which cannot be passed by the metal filings. The changed hachure of barrier 526' illustrates that the barrier 526 has disintegrated or become porous, which allows the metal filings to pass the barrier 526' and move into sub-area II where they proceed further until they reach barrier 527.

G-force sensitive area 105 displaying pattern 508 indicates a fourth centrifugation state according to which a g-force above the third threshold value, the third threshold lying above the second threshold, was applied. As the metal filings have detached from the filling material in all sub-areas and as the barriers 526 and 527 have disintegrated or become porous, the metal filings of sub-areas I, II and III accumulate just above the lower end of sub-area III as indicated in pattern 508. As a result, a reading device can read a bar code 517 comprising one bar just above the lower end of sub-area III.

Embodiments of the g-force sensitive label whose area 105 is depicted in FIGS. 5a and 5b can be created as described by distributing metal filings 519 in a non-metallic filling material 529. The application of a g-force of different strengths can be indicated by the embodiment of FIG. 5b by a multitude of patterns 510, 506, 507, or 508 and corresponding machine-readable codes 514-517 (pattern 514: no code). The codes can be read by, e.g., a metal detector, a Hall-effect detector, or an optical detector provided the color of the metal filings contrasts with the color of the filling material. According to further embodiments, the metal filings may be substituted by any other material, including non-metallic material, having a color contrasting with the color of the filling material. If non-conductive material substitutes the metal filings, the usage of optical detectors is typical.

A further variant of a g-force sensitive area 105 is depicted in FIG. 5c, wherein different centrifugation states and corresponding patterns 502, 503, 504 and 505 on the g-force sensitive area 105 are depicted together with the corresponding machine-readable codes 509, 511, 512 and 513. This variant of g-force sensitive area 105 comprises three sub-areas depicted as sub-areas I-III, wherein each sub-area is separated from any adjacent sub-area by a barrier 424, 425. Each sub-area is filled with a filling material of a first color and comprises micro-shells 518 which are distributed approximately homogeneously within the filling material. The barriers 524, 525 are of the same first color as the filling material or a color not contrasting with the first color. The micro-shells 518 are filled with a second material of a second color, the second color contrasting with the first color. The second material may be a liquid, a gel, a powder, in particular toner powder, pigment, clay or ceramics, particles, metals, alloys or the like. As the second material is contained within micro-shells 518, the second color is not visible as long as the micro-shells do not disintegrate.

The shells of the micro-shells 518 are made of a force-sensitive material. According to typical embodiments, the force sensitive material is the same for all micro-shells within one sub-area but differs between the micro-shells of different sub-areas. According to the embodiment depicted in FIG. 5c, the force sensitive material of the micro-shells 518 in sub-area I disintegrates upon applying a g-force above a first threshold value, thereby releasing the second material into sub-area I. In case a sufficiently high proportion of the micro-shells within a particular sub-area disintegrates and releases the second material, the color of that sub-area turns into the second color or a mixture of the first and the second color, and that mixture of colors contrasts with the first color. As a result, a code can be read by a reading device. The force sensitive material constituting the shells of the micro-shells in sub-area II disintegrates upon applying a g-force above a second threshold value, the second threshold value lying above the first threshold value. In case the g-force above the second threshold value is applied to the g-force sensitive label depicted in FIG. 5c, the first color of sub-area I and II turns into a second color or a mixture of the second and the first color. The force sensitive material constituting the shells of the micro-shells in sub-area III disintegrates upon applying a g-force above a third threshold value, the third threshold value lying above the second threshold value. Pattern 502 indicates a centrifugation state according to which the g-force sensitive label of the embodiment of FIG. 5c has not been subjected to a g-force above the first threshold value. As a result, the micro-shells are intact, and all sub-areas are a first color. Pattern 503 indicates a centrifugation state being the result of applying a g-force above the first and below the second threshold value. The force sensitive material of the micro-shells within sub-area I has disintegrated, resulting in a color change of sub-area I. The material of the micro-shells of sub-areas II and III is still intact, sub-areas II and III still being a first color, resulting in pattern 503 corresponding to bar code 511. Bar code 511 comprises one bar at the position of sub-area I and indicates the application of a g-force between the first and the second threshold value. Pattern 504 indicates a centrifugation state being the result of applying a g-force above the second and below the third threshold value having resulted in the disintegration of the micro-shells in sub-areas I and II. As a result, the color of sub-areas I and II changed. As a consequence, a reading device can read a bar code 512 comprising two bars at their position of sub-area I and II, the bars being separated by the barrier layer 524 not comprising any micro-shells.

Pattern 505 indicates a centrifugation state being the result of applying a g-force above the third threshold value. As the force sensitive material constituting the shells of the micro-shells in sub-area III disintegrates when applying a g-force above the third threshold value, all sub-areas I-III have changed color, resulting in a bar code 513 comprising three bars. The second material may have physical or chemical properties resulting in the attachment of the second material to the filling material after the micro-shells have disintegrated, thereby prohibiting that the second material migrates, e.g., from sub-area I into sub-area II, during the application of a g-force. According to further embodiments, the shells of the micro-shells are of higher density than the filling material and are firmly attached to the filling material at a particular spot of the shell surface. Shear forces acting on the shells when a g-force above a threshold value is applied result in a disintegration of the shell, because parts of the shell are attached to the filling material while the other parts tend to move in the direction of the g-force. By using shell material of different density or by varying the size of the shells, the threshold value for the g-force and corresponding shear forces resulting in a disintegration of the shell may be varied as needed.

According to further embodiments, the second material may be released from the micro-shells due to g-force induced compression, tensile stress or the like. Instead of micro-shells, any kind of force sensitive agglomeration of the second material may likewise be used which disintegrates, implodes, disperses or otherwise changes its shape and/or distribution upon the application of a g-force and whose release results in the change of colors of a sub-area.

The described embodiments allow the construction of a g-force sensitive label being operable to indicate two or more different centrifugation states corresponding to g-forces of different strength. Other embodiments are based on the same principles as described beforehand for FIG. 5c but make use of one, of two or of even more than three sub-areas (not shown).

FIGS. 5d and 5e depict a further embodiment of a g-force sensitive label 531 in unspun state (left side) pieces and spun state (right side). This embodiment comprises a g-force sensitive area comprising a first housing 532, 532' below a transparent window 306, the transparent window comprising an all Park 1D or 2D or alpha-numeric code 530 having a first color. The first housing in unspun state contains a filling material of first color or a color not contrasting with the first color. As long as no g-force above a first threshold value is applied to the g-force sensitive label 531, the code 530 is not visible because it does not contrast with the filling material of the first housing 532. The filling material changes its color into a second color contrasting with the first color upon applying a g-force above the first threshold value. This effect can, for example, be reached by force sensitive micro-shells 518 comprising material of the second color which is released upon applying the g-force on the label 531.

FIG. 6a depicts an analytical system 600 comprising a computer readable, non-transitory storage medium 601. The storage medium should be taken to include a single medium or multiple media, e.g., a centralized or distributed database, and/or associated cache and servers that store the one or more sets of instructions 602. When the set of instructions 602 is executed by processor 603, the analytical system 600 is caused to perform any one or more of the methodologies of embodiments of the present invention. The computer readable non-transitory storage medium 601 shall accordingly be taken to include, but not be limited to, solid-state memories, optical and magnetic media such as, but not limited to, any type of disc including floppy disks, optical discs, CD-ROMs, and magnetic-optical discs, ROMs, RAMs, magnetic or optical cards or any type of media suitable for storing electronic instructions. The analytical system 600 further comprises at least one analyzer 605 and a reading device 604, in particular a bar code reader for reading the centrifugation state of a sample tube 100 from a g-force sensitive label.

FIG. 6b depicts a g-force sensitive label 103 comprising an area 105 for detecting and indicating the application of a g-force above a threshold value on the label 103, wherein at least one physical property of the area measurably changes its state upon applying a g-force above the threshold value, thereby altering pattern displayed in the area, such that a machine-readable 1D or 2D or an alpha-numeric code is displayed on the area 105. The g-force sensitive label 103 further comprises an attachment area for attaching the label on an object, e.g., a sample tube. The area for attaching could, e.g., be an adhesive layer 651 at the back side of the label 103.

Figure 7:
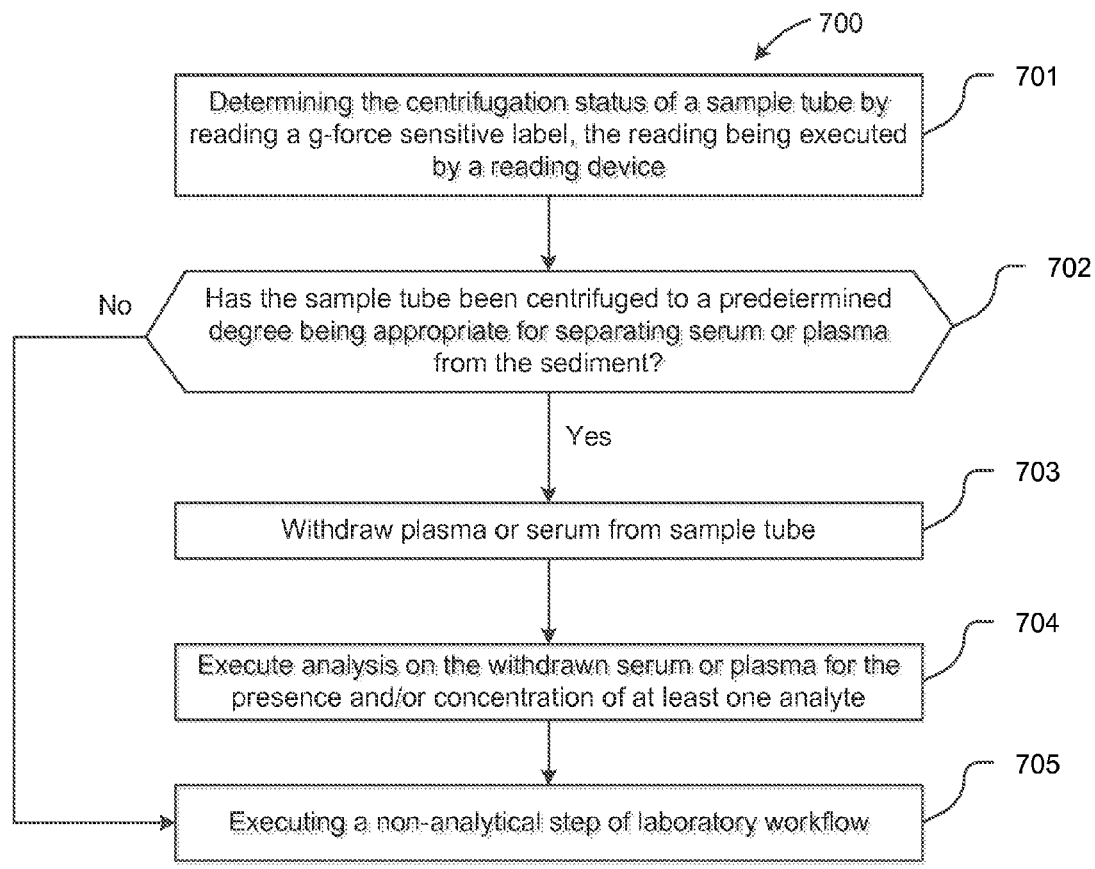
FIG. 7 is a flowchart of a method for determining the centrifugation status of a sample tube in accordance with an embodiment of the present invention.

FIG. 7 depicts a method 700 for determining the centrifugation status of a sample tube with the help of a g-force sensitive label, according to an embodiment of the present invention. The method comprises the step 701 of determining the centrifugation status of a sample tube by reading a g-force sensitive label. The reading is executed by a reading device, e.g., a bar code reader, a matrix code reader, or the like. In step 702 it is determined, e.g., by a software module receiving the bar code or bar code related information from the reading device, whether the sample tube has been centrifuged to a predetermined degree being appropriate for separating serum or plasma from the sediment, the separation allowing the withdrawing of serum or plasma from the sample tube. The appropriate degree of a centrifugation is determined in particular by the strength of the g-force applied on a sample during centrifugation and the centrifugation time.

According to further embodiments, additional parameters such as centrifugation temperature and the like may also be considered. In case it is determined that the sample tube has been centrifuged to the determined appropriate degree, e.g., according to an appropriate g-force for an appropriate time, in step 703 the plasma or serum is withdrawn from the sample tube automatically or manually and an analysis is executed in step 704 on the withdrawn serum or plasma. The analysis is executed by an analyzer, e.g., analyzer 605 (see FIG. 6a), and determines the presence and/or concentration of one or more analytes within the withdrawn serum or plasma.

Analyses are laboratory procedures performed by an analyzer characterizing a parameter of a biological sample, e.g., its opacity, its concentration, or any other physical, chemical or biological property of an "analyte" of the sample. An analyte is a component of a sample to be analyzed, e.g., molecules of various sizes, ions, proteins, metabolites and the like. In case it has been determined in step 702 that the sample was not centrifuged to the determined appropriate degree (the sample could have been centrifuged not at all, for a too long period of time, or could be subjected to a too low or too high g-force), a non-analytical step 705 of a laboratory workflow is executed. For example, a warning message could be sent to the requestor of the analysis or the operator of the laboratory. According to some embodiments, the sample tube is discarded automatically. According to a further embodiment of the invention, the sample is transferred, e.g. by a conveyor belt, robotic arm or the like, to an output position from where the sample can be taken by an operator.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A sample tube for centrifuging biological samples, said sample tube having an upper end and a lower end, and comprising a g-force-sensitive label for detecting and indicating the application of a g-force, wherein at least one physical property of an area of said label measurably changes its state upon application of a g-force above a threshold value on the sample tube in a direction from the upper end of the tube towards the lower end,
   wherein said label is a multi-layer label comprising an area including:
   a first layer containing a transparent window, and
   a second layer comprising a first housing positioned below the transparent window, the second layer further comprising a sliding pane within an upper extension, the upper extension not being positioned below the transparent window, the sliding pane comprising one of a 1D code, a 2D code, and an alpha-numeric code on that side of the sliding pane facing the first layer, the sliding pane leaving the upper extension and moving into the first housing upon the g-force above the threshold value acting on the sample tube, thereby making the one of the 1D code, the 2D code, and the opaque alpha-numeric code on the sliding pane visible through the transparent window.

2. The sample tube according to claim 1, wherein said g-force-sensitive label upon application of the g-force above the threshold value alternates a pattern displayed in said area such that one of the 1D code, the 2D code, and the alpha-numeric code is displayed, each of the 1D, 2D, and alpha-numeric code being readable by a reader device.

3. The sample tube according to claim 1, wherein the threshold value is a g-force above about 500 g.

4. The sample tube according to claim 1, wherein said area comprises a layer containing metal filings distributed according to a first distribution state, the layer being of a material holding the metal filings stably at their position at first distribution state as long as the g-force above the threshold value is not applied on the sample tube, the material allowing the metal filings to move towards the lower end of the sample tube upon the g-force above the threshold value acting on the sample tube, thereby changing the distribution of the metal filings in a way that is detectable by a metal sensor device.

5. The sample tube according to claim 4, wherein the metal sensor device is a Hall effect sensor, a magnetic sensor or an optical sensor.

6. The sample tube according to claim 1, wherein said area comprises a layer containing particles of a first color distributed according to a first distribution state, the layer being of a material holding the particles stably at their position at first distribution state as long as the g-force above the threshold value is not applied on the sample tube, the material allowing the particles to move towards the lower end of the sample tube or towards the upper end of the sample tube upon the g-force above the threshold value acting on the sample tube, thereby changing the distribution of the particles in a way being detectable by an optical sensor device.

7. A sample tube for centrifuging biological samples, said sample tube having an upper end and a lower end, and comprising a g-force-sensitive label for detecting and indicating the application of a g-force, wherein at least one physical property of an area of said label measurably changes its state upon application of a g-force above a threshold value on the sample tube in a direction from the upper end of the tube towards the lower end, wherein said label is a multi-layer label comprising an area including
  a first layer containing a transparent window;
  a second layer comprising a first housing below the transparent window, a back wall of the first housing comprising one of a 1D code, a 2D code, and an alpha-numeric code on a side of the back wall facing the first housing; and
  a sliding pane, the sliding pane being (i) located within the first housing when long as the g-force above the threshold value has not been applied on the sample tube, thereby hiding the one of the 1D code, the 2D code, and the alpha-numeric code on the back wall, and (ii) located within a lower extension of the first housing upon the g-force above the threshold value acting on the sample tube, thereby making the one of the 1D code, the 2D code, and the alpha-numeric code on the back wall of the first housing visible through the transparent window.

8. The sample tube according to claim 1 further comprising a separation gel which upon centrifugation of the sample tube filled with sample forms a separation layer between a cell portion and a serum or plasma portion of the sample.

9. The sample tube according to claim 1, wherein one of the 1D code, the 2D code, and the alpha-numeric code is configured to be displayed or altered upon applying the g-force above the threshold value.

10. The sample tube according to claim 9, wherein the one of the 1D code, the 2D code, and the alpha-numeric code is a bar-code, a matrix code, a pattern, or an alpha-numeric symbol.

11. The sample tube according to claim 2, wherein the one of the 1D code, the 2D code, and the alpha-numeric code is machine-readable and is displayed stably after a g-force of more than the threshold value has been applied on the sample tube at least once.

12. An analytical system comprising:
  a sample tube including a g-force sensitive label that is indicative of whether or not the sample tube has been centrifuged;
  a reading device to read the g-force sensitive label on the sample tube;
  at least one analyzer electrically coupled to the reading device;
  a processor electrically coupled to the at least one analyzer; and
  a computer-readable non-transitory storage medium having stored computer-interpretable instructions, which, when executed by the processor, use information read by the reading device from the sample tube to determine:
    if said sample tube has been centrifuged to a predetermined degree, the predetermined degree being appropriate for withdrawing serum or plasma from said sample tube,
    if said sample tube has been centrifuged to a predetermined degree, analyzing said withdrawn serum or plasma for the presence of one or more analytes by the analyzer, and
    if said sample tube has not been centrifuged to a predetermined degree, conducting a non-analytical process step.

13. The analytical system according to claim 12, wherein said non-analytical process step is centrifugation of the sample tube or transferring said sample tube to an output position from where the sample can be taken by an operator.

* * * * *